INVENTORS
WALTER G. DRISCOLL
ARTHUR L. DAVISON
BY JOHN R. LEEMAN

Morss, Altman + Oates

ATTORNEYS

INVENTORS
WALTER G. DRISCOLL
ARTHUR L. DAVISON
JOHN R. LEEMAN
BY Morse, Altman + Oates
ATTORNEYS

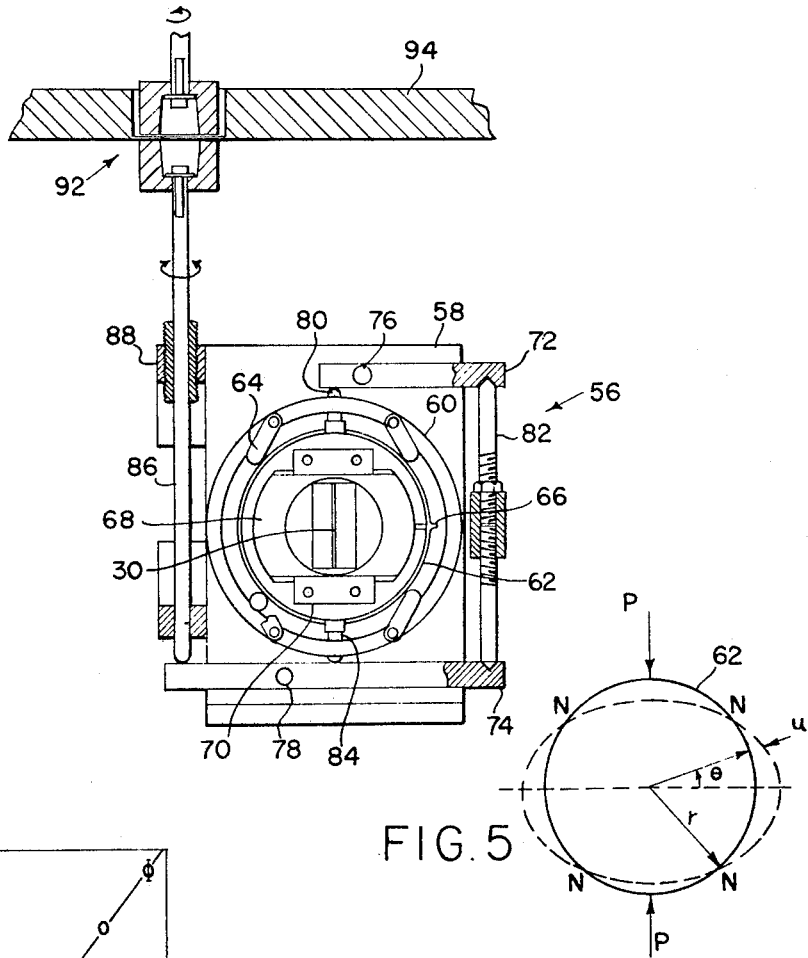
FIG. 4
FIG. 5
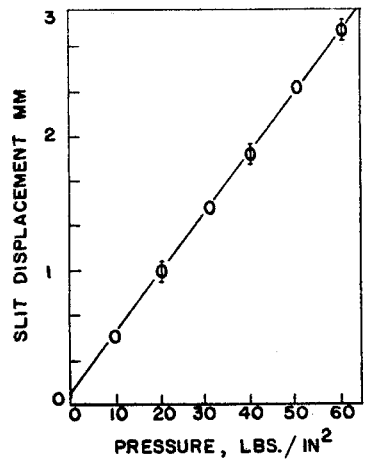
FIG. 6
INVENTORS
WALTER G. DRISCOLL
ARTHUR L. DAVISON
JOHN R. LEEMAN
BY
Morse, Altman + Oates
ATTORNEYS United States Patent Office 3,503,685
Patented Mar. 31, 1970

3,503,685
TEMPERATURE COMPENSATED SPECTROSCOPIC
APPARATUS
Walter G. Driscoll, 163 Moore Road, Sudbury, Mass. 01776; Arthur L. Davison, 747 S. Fillmore, Allentown, Pa. 18103; and John R. Leeman, 411 Medford St., Somerville, Mass. 02145
Continuation-in-part of application Ser. No. 227,857, Oct. 2, 1962. This application Mar. 15, 1967, Ser. No. 623,268
Int. Cl. G01j 3/04
U.S. Cl. 356—80                                    4 Claims

ABSTRACT OF THE DISCLOSURE

In a spectroscopic apparatus, the support for exit slits is fabricated from a material having a coefficient of expansion selected to compensate for changes in the inter-ruling grating space resulting from changes in ambient temperature.

---

Figure 1:
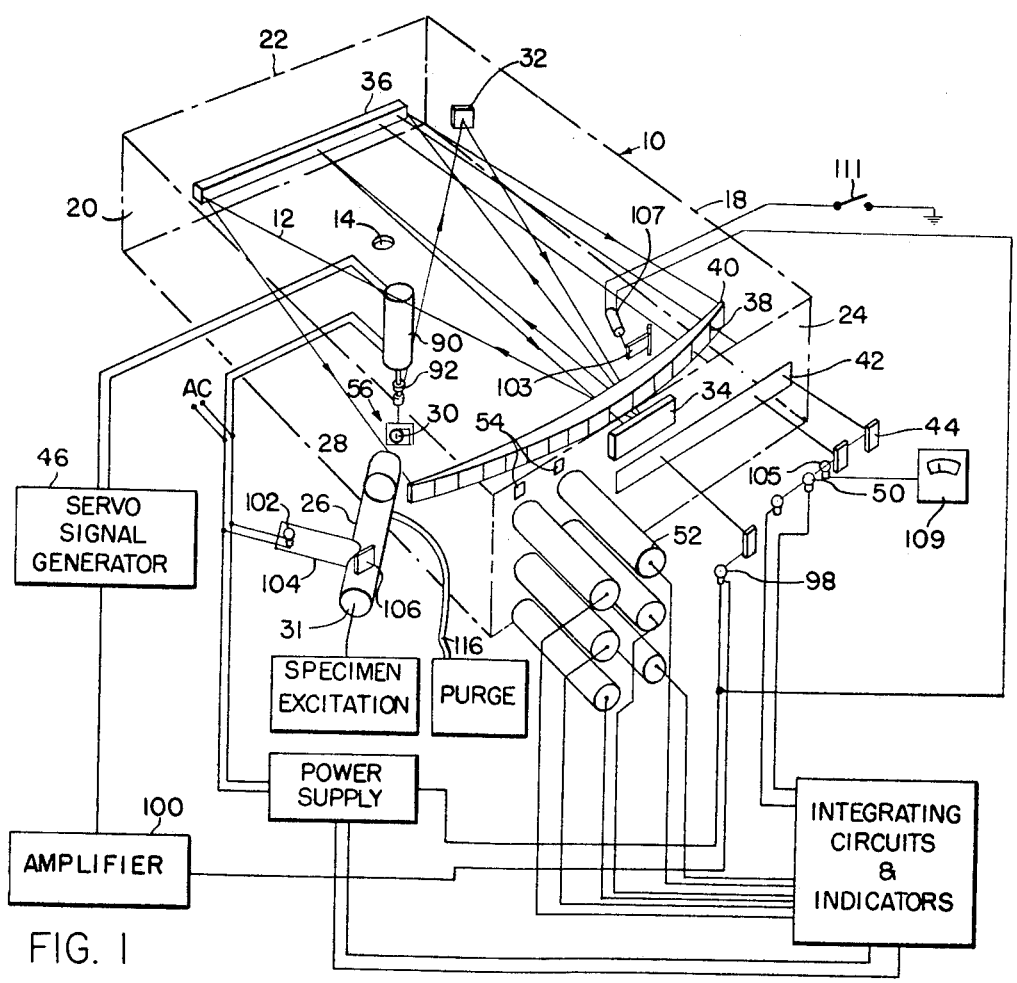

This application is a continuation-in-part of our U.S. application Ser. No. 227,857, filed Oct. 2, 1962, now abandoned.

This invention relates in general to spectrum analysis and more particularly concerns a new and improved spectrometer having special utility in spectrochemical analysis in the near Schumann region of the vacuum ultra-violet.

In spectrochemical analysis, the chemical composition of a specimen is established by determining the intensity distribution of radiation of characteristic wavelengths emitted by the specimen under excitation. When the analysis involves ultra-violet emission in the range of 1200–1850 angstroms, it is necessary that the operation be carried out in a vacuum or a transparent medium because the oxygen content in air absorbs radiation strongly below 1850 angstroms.

Existing spectroscopic apparatuses, which are designed to study wavelengths in the range of 1500–4800 angstroms, for example, are both cumbersome and expensive largely because of the size of the chamber needed to enclose the instrument and which chamber must be evacuated to pressures on the order of $10^{-5}$ torr. The pumping equipment for obtaining and maintaining such a low vacuum is itself expensive thereby adding to the cost of the apparatus.

Instruments of this sort must be precisely aligned so that the exit slits will be in register with their associated spectral lines. This problem is a particularly critical one since even small changes in ambient temperature are sufficient to produce misalignment through expansion or contraction of frame members. In some direct reading type spectrometers, a monitor and servo system are employed to pivot the grating one way or another to maintain proper alignment. However, the equipment associated with such a system is too large and mechanically awkward for practical installation in a highly evacuated chamber.

For these and other reasons spectroscopic instruments for analyzing complex spectra, including emission in the vacuum ultra-violet, have not been particularly satisfactory heretofore and it is an object of the present invention to provide improvements in spectroscopic devices and particularly in automatic spectrometers designed to function in this extreme ultra-violet range.

Another object of this invention is to provide a compact spectrometer that is capable of efficient and versatile operation.

Yet another object of this invention is to provide a self-adjusting spectroscopic apparatus which is not adversely affected by dimensional changes brought on by fluctuation in ambient temperatures.

Still another object of this invention is to provide in a spectroscopic instrument an adjustable entrance slit of improved design.

More particularly, this invention features an enclosed spectroscopic instrument having a folded light dispersion system which occupies approximately one half the space normally required for a conventional system of this type. As another feature of this invention, the support for the exit slits is fabricated from a material having a coefficient of expansion selected to compensate for changes in the inter-ruling grating space resulting from changes in ambient temperature. Still another feature of this invention relates to a servo controlled entrance slit which is laterally displaceable in response to distortion of a supporting loading ring whose distortion-force is known and is precisely linear.

Figure 7:
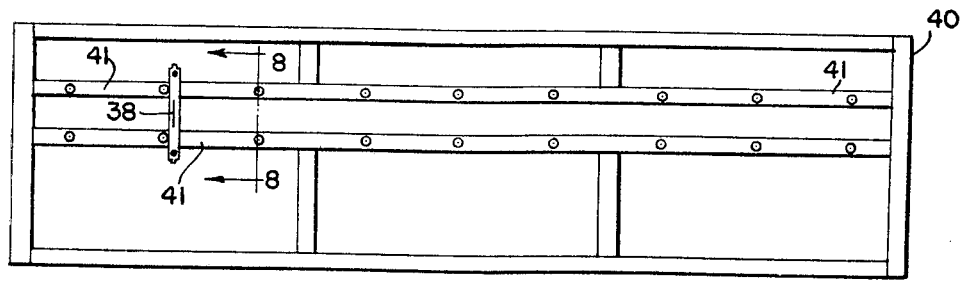
Figure 8:
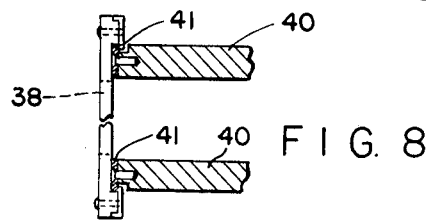
Figure 2:
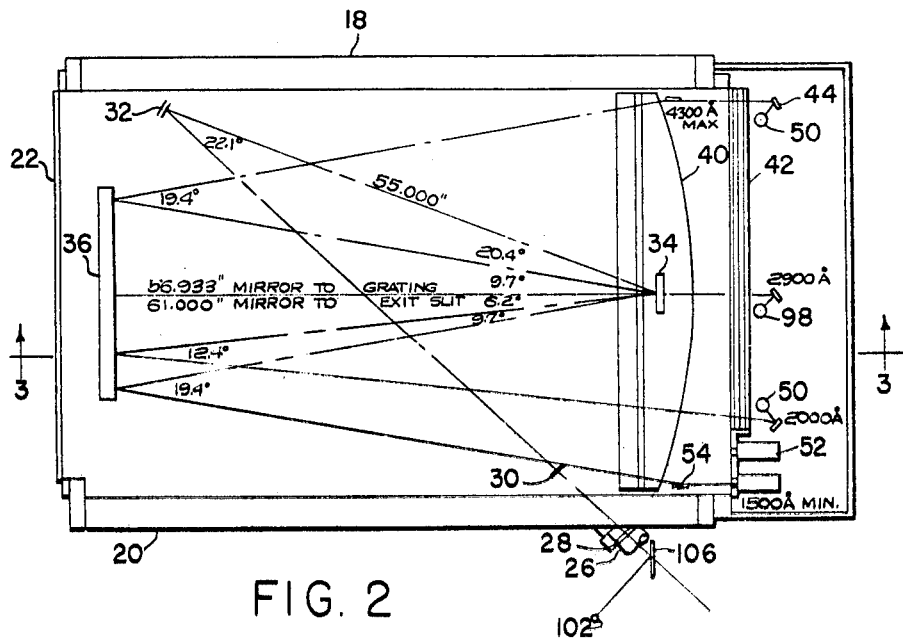
Figure 3:
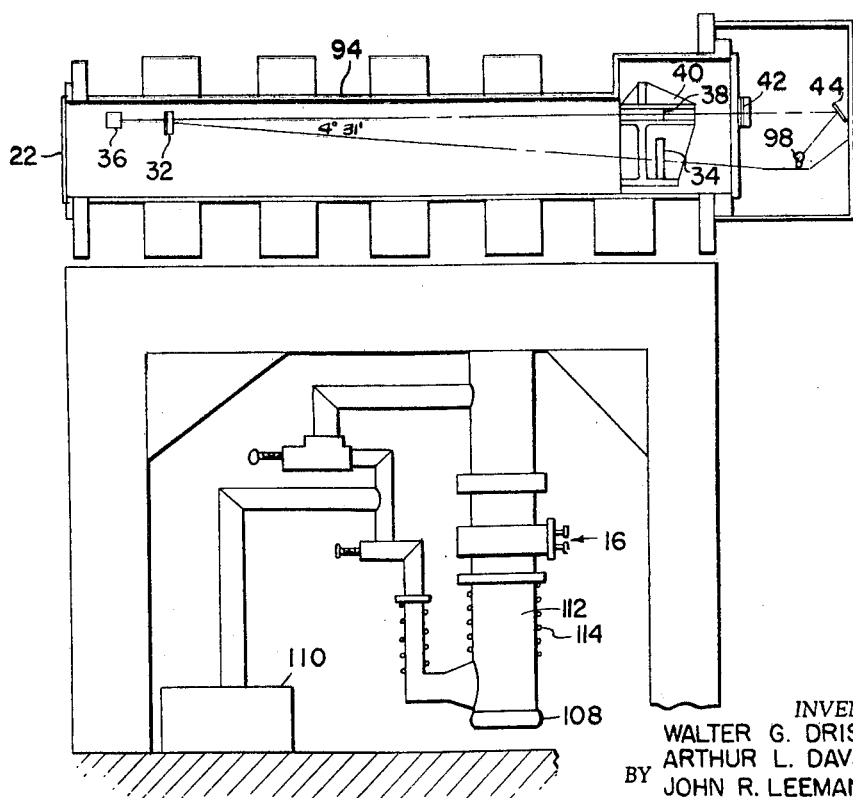

But these and other features of the invention, along with further objects and advantages thereof will become more readily apparent from the following description of a preferred embodiment of the invention, with reference being made to the accompanying drawings in which;

FIG. 1 is a perspective view, somewhat schematic, of an automatic spectroscopic apparatus made according to the invention, FIG. 2 is a top sectional plan view of the apparatus, FIG. 3 is a view taken along the line 3—3 of FIG. 2, FIG. 4 is a front elevation partly in section of the laterally adjustable entrance slit, FIG. 5 is a distortion diagram for the entrance slit mount, FIG. 6 is a calibration graph illustrating the linearity of slit displacement upon distortion of the loading ring used in the slit mechanism, FIG. 7 is a rear elevation of the mounting assembly of the exit slits, and, FIG. 8 is a cross-sectional view taken along the line 8—8 of FIG. 7.

Referring now to the drawings, it will be seen in FIGS. 1–3 that the spectroscope is generally organized about an air-tight boxed housing 10 fabricated from heavy steel plate, for example, and preferably having welded joints. The housing includes a bottom wall 12 having a port 14 for connection with an evacuating system 16 (FIG. 3), upright side walls 18 and 20 and opposing end walls 22 and 24.

Mounted diagonally through side wall 20 and near end wall 24 is a cylindrical tube 26 closed at its inner end by means of a lens 28 and at its outer end by a cap 31. Within the tube 26 the specimen to be examined is excited by any one of several well known techniques. The radiation emitted by the excited specimen passes through the lens 28, preferably formed of calcium fluoride which is transparent down to about 1300 angstroms, through a slit 30 and against an entrance mirror 32 mounted diagonally on the side wall 18 near the end wall 22. From the mirror 32 the beam is reflected against a grating 34 which disperses the spectrum. The dispersed beam reflects from the grating 34 against an elongated folding mirror 36 on the end wall.

From the folding mirror 36 the dispersed component wavelengths are directed through exit slits 38 disposed along the focal curve of the system and mounted to an arcuate frame 40 by means of strips 41 fastened to the rear curved face of the frame. Those rays in the range of 2000 to 4300 angstroms are then passed out of the evacuated chamber through an elongated window 42 mounted in the end wall 24. Typically, the window is made of quartz or some other suitable material having similar transmission characteristics in the above range. A series of small focusing mirrors 44 are arranged in spaced relation along a supporting bracket 45 each in opposing registration with an appropriate slit 38. Each mirror, it will be seen, is adjusted to reflect a beam of a particular wavelength against a photomutiplier tube 50 the output of which is fed to integrating circuits where the intensities of the spectrum lines are indicated.

While the transmission characteristic of quartz is satisfactory above 2000 angstroms its absorption becomes objectionable below this wavelength, 1 cm. of quartz, for example, displays 25–30% absorption at 1860 angstroms. For this reason a battery of six end-mounted photomultipliers 52 are grouped behind the slits 38 at the 1500–2000 angstroms end of the spectrum. Each of these photomultipliers is sealed within a cylindrical tube that is in free communication with the evacuated interior of the housing 10. Since the spacings between the slits do not permit side mounting of the end mounted photomultipliers 52, these tubes are arranged in vertical columns with mirrors 54 being employed to reflect the appropriate beam against the proper tube. This arrangement extends the range of sensitivity of the instrument to include wavelengths down to 1500 angstroms providing a wide range of operation. In this area, a vacuum of $10^{-5}$ torr is required since air absorbs highly in this region. This range of operation permits analysis of simple narrow bands as well as complex spectra such as those emitted by ferrous base materials which typically include carbon, phosphorus, sulfur and other elements which appear in the vacuum range.

Referring now more particularly to FIG. 2, it will be seen that the optical design may be characterized as a fixed focus folded Rowland mount or a folded Paschen-Runge mount in the Rowland position with a concave grating having a 3 meter radius of curvature and a focal curve having a 1.5 meter radius of curvature. The Rowland position parameters yield maximum linearity of dispersion over a wide spectral range which, with a 30,000 grooves per inch grating, gives (in terms of the linear reciprocal dispersion) 2.76 A./mm. at the mean wavelength and 2.72 A./mm. at the extreme wavelength. The system thus provides perfect symmetry of the diffracted beams in addition to maximum linearity.

One signaficant advantage obtained from the above system is the minimization of the maximum angle at which a beam of any particular wavelength passes through the focal curve. It will be appreciated that this angle can be kept relatively small by utilizing both sides of the optical centerline with a selected wavelength falling along the centerline and employing exit slits having both positive and negative angles. This had the added advantage of simplifying the manufacturing of the exit slits since similar slits may be mounted on opposite sides of the centerline in opposite directions. Each slit must be made with great care and precision to insure that the angle is correct. Obviously, it would be a very difficult matter to make a number of slits each of a different angle as would be the case if only one side of the optical centerline were employed. By placing slits on both sides of the centerline, the angles at which the several beams pass through the focal curve are kept small and the variety of slit elements is reduced to one-half that normally required.

In order to obtain sufficient dispersion of a complex spectrum, the focal curve must be spaced about 10 feet optically from the grating. A housing of this size would be exceptionally heavy, would occupy an excessive amount of space in a laboratory and would be difficult to evacuate. By folding the beam in the manner shown, the length, weight and volume of the apparatus is approximately halved to provide a lighter, more compact housing that may be more easily evacuated.

Since the apparatus operates under a high vacuum, the environmental effects due to pressure fluctuations will be negligible. However, changes in ambient temperatures could easily misalign the apparatus, if not corrected. Assuming a uniform temperature change in the apparatus, for example, cubic expansion will result if its components are all of the same material. The triangles defined by the grating center, slits and the beam position on the mirrors will be larger or smaller but will remain similar. The effect is then self-compensating since the incident angle and effective diffraction angle remain constant. However, the temperature change will modify the inter-ruling grating spaces. According to this invention, this change in the grating spacings is compensated for by selecting an exit supporting strip 41, located along the focal curve, from materials whose coefficient of linear expansion will result in the positions of the exit slits along the focal curve changing at such a rate as to theoretically compensate exactly for the effective change in diffraction angle.

By way of explanation, consider the grating equation $P\lambda = S(\sin a + \sin b)$, where S is the spacing of the grating rulings, P the order of the diffracted spectral lines, $a$ the incident angle, $b$ the diffraction angle, and $\lambda$ the wavelength of the diffracted spectral lines. Since S changes with temperature, $a$ or $b$ may be changed at the focal curve to compensate. Theoretically, if a temperature rise occurs then the positions of either of the extreme wavelengths is going to contract precisely the same amount toward the normal because expansion of the grating reduces the number of lines per inch and crowds the spectral lines closer together. Countering this is an increase in the focal length which causes a spreading of the spectral lines. This means that the array of exit slits, whose positions are determined by the focal curve, should expand at a different rate than either to compensate exactly for the effective change in diffraction angle.

It can be shown, for example, that if the housing 10 is of hot rolled steel, the slit supporting frame along the curve should be of a material which expands less than the housing by $3 \times 10^{-6}$ unit lengths/° C. This means that the focal curve strips 41 should have a linear coefficient of expansion of $9.1 \times 10^{-6}$ unit lengths/° C. A common alloy of stainless steel (416) is within 10% of this value and in the preferred embodiment of the invention is employed in the strips 41.

For example, consider:

$$P\lambda = s(\sin a + \sin b)$$

then $$\frac{\Delta \lambda}{\Delta t} = \frac{\Delta s}{\Delta t} (\sin a + \sin b)$$

for $\Delta t = 18°$ F. $= 10°$ C.; $P=1$; and ($\Delta S = s_0 c \Delta t$ "Pyrex") where $s_0$ is initial grating space and $c$ is the expansion coefficient.

| $\lambda$ | $\Delta\lambda$ | $\Delta d$ |
| --- | --- | --- |
| 1,500 A. | 0.045 A. | 16.5 microns 15μ over corrected from mean. |
| 2,900 A. | 0.087 A. | 31.5 microns mean. |
| 4,300 A. | 0.129 A. | 46.5 microns 15μ under corrected from mean. |

In the foregoing $\Delta d$ represents the change in the linear distance at the focal curve. This is the position change of the particular wavelength at the focal or arcuate member. With regard to the third column under the heading $\Delta d$, if compensation is made through the servo system for the 2900 A. wavelength (mean wavelength) then the 1500 A. wavelength position will be over shifted or over corrected by 15 microns and likewise the 4300 A. wavelength position will be under shifted or under corrected by 15 microns due entirely to the dispersion change because of grating expansion.

The expansion coefficient of the focal curve relative to that of structural members can be calculated by solving the equation:

$$\Delta L_{f.c.} = L\Delta c\Delta t = 15 \text{ microns}$$

where $\Delta c = c_s - c_{f.c.}$; $L$ = focal curve half length $$= 20 \text{ inches} \times \frac{25.4 \times 10^3 \text{ microns}}{\text{inch}} \times 10° \text{ C.} \times \Delta_c$$

$= 15$ microns therefore:

$\Delta c = 3 \times 10^{-6}$ unit lengths per degree centigrade
$c_s = 12 \times 10^{-6}$ unit lengths per degree centigrade
$c_{f.c.} = 9 \times 10^{-6}$ unit lengths per degree centigrade
$c_{416 \text{ s.s.}} = 9.9 \times 10^{-6}$ unit lengths per degree centigrade where $c$ is expansion coefficient, $\Delta t$ the temperature change, $c_s$ is the coefficient of expansion of the structure in unit lengths/degree centigrade, $c_{416 \text{ s.s.}}$ is the coefficient of expansion of type 416 stainless steel, and $\Delta L$ the focal curve expansion change.

To keep the stainless steel strips 41 from breaking or distorting with respect to the frame 40 during a change in ambient temperature, the frame 40 has been fabricated from a material such as aluminum which has a relatively high coefficient of expansion relative to that of stainless steel. It will be appreciated that by employing such a material in the frame, the strips 41 will be held tightly against the curved rear face of the frame since the frame will expand at a greater rate than the strips. It will also be appreciated that instruments of this type are normally aligned at a temperature of about 70° F. and maintained and operated in temperature controlled rooms. As a result, it will be expected that only positive temperature changes will take place.

In order to correct for any misalignment caused by temperature and mechanical changes and not completely compensated for by the strips 41, additional means are provided for keeping the component wavelengths of the spectrum in proper register with the exit slits. For this purpose, a novel, servo controlled mount 56 (FIG. 4) is provided for laterally displacing the entrance slit 30. The support assembly for the entrance slit includes an apertured plate 58 mounted to the housing 10 and having an annular flange 60 disposed concentrically about the plate opening. A loading ring 62 is supported concentrically within the annular flange 60 by means of four symmetrically arranged roller elements 64. Typically, the loading ring 62 is fabricated from steel and is provided with a horizontal tie rod 66 which engages one side of an apertured block 68. The block 68, in turn, is slidably mounted between a pair of horizontal bearings 70 fastened to the face of the plate 58 and carries the slit 30 centrally therein.

By applying opposing equal vertical forces to the loading ring 62, it will undergo a distortion which will be symmetrical about the line of action of applied forces as indicated in the distortion diagram of FIG. 5. The mechanism employed to apply pressure to the ring 62 includes upper and lower horizontal levers 72 and 74 pivoted at 76 and 78 respectively. As viewed in FIG. 4 the left hand end of the lever 72 bears down against the upper portion of the ring 62 through a vertical pin 80 engaging both members and passing radially through the flange 60. The right hand end of the lever connects with the upper end of a vertical actuator 82 the lower end of which is supported by the right hand end of the lever 74. A second vertical pin 84 depends from the ring 62, through the flange 60 to engage the lever 74 between the right hand end and its pivot point 78. The left hand end of the lever 74 is biased downwardly by means of a drive stem 86 in threaded engagement with a tapped shoulder 88. It will be understood that by rotating the stem about its longitudinal axis in one direction or another opposing vertical forces can be applied or relieved on the ring 62. When the ring undergoes a distortion the slit 30 will be translated laterally since the slit is attached to one side of the ring.

Referring more particularly to FIG. 3, the distortion of an originally circular ring will be symmetrical about the lines of action of applied forces as shown and can be expressed by the equation $$\mu = \left(\frac{3Pr^3}{Ebt^3}\right)\left(\frac{4}{\pi} - \theta \sin\theta - \cos\theta\right)$$

Where $\mu$ is the displacement at angle $\theta$, P is the applied force, $r$ is the radius, E is the elasticity, $b$ is the length of the cylinder (i.e., the axial length of the ring) and $t$ is the wall thickness of the ring. In the foregoing ring the nodal points are located at 46°24.5′ to either side of the vertical axis.

The entrance slit 30, which is of a set width, is fixed to a point perpendicular to the force P and will be translated laterally. Assuming a thirty pound force applied to a brass ring 3″ in diameter, 0.065″ wall thickness and 0.188″ in axial length, displacement may be calculated as follows:

where $\theta = 0°$ $$\mu'' = \frac{3Pr^3}{Ebt^3}\left(\frac{4}{\pi} - 1\right) = 0.820 \frac{Pr^3}{Ebt^3}$$

$$= 0.820 \times \frac{30 \cdot 1.5^3}{15 \cdot 10^6 \cdot 0.188 \cdot 0.065^3} 25.4 \text{ mm.}$$

$$= 2.72 = \pm 1.36 \text{ mm.}$$

The points indicated by N in FIG. 5 represent the nodal points of the ring. Since the ring is fixed at these nodal points by the elements 64 (FIG. 4) a very rigid and stable mount is provided. The calibration graph of FIG. 6 demonstrates the extreme linearity and precision of the device with an uncertainty which is something less than plus or minus one micron.

Operation of the slit moving mechanism is automatically controlled by means of a servo motor 90 which is adapted to rotate the stem 86 in either direction through a magnetic coupling 92 having components on either side of an upper wall 94 of the housing 10 to preserve airtight integrity. The system for driving the servo motor 90 generally corresponds with that disclosed in U.S. Patent 2,937,661 and includes a servo signal generator 46 which receives a correcting signal from a photomultiplier tube 98 through an amplifier 100. The output of a gas discharge tube 102, mounted in a right angular extension 104 to the tube 26, is reflected by a mirror 106 through the slit 30 and is adapted to provide monitoring radiation which is detected by the photomultiplier tube 98.

To insure that the servo-monitor system is functioning properly a simple but unique checking system is provided for periodic verification. The checking system includes a deflection plate 103 mounted in the path of an auxiliary mercury line, such as 3650 angstroms, for example. The mercury spectrum used to supply the error signal for the servo system may be employed for the verification operation. The 3650 A. line passes through the plate 103 and is monitored on a photo-tube 105 the output of which is measured on a meter 109. The plate is pivotally mounted within the housing and is normally disposed 90° with respect to the monitored line. A solenoid 107, actuated by a switch 111, is adapted upon energization, to rotate the deflection plate through an angle of perhaps 12° or so with respect to the path of the monitored line. This will displace the line with respect to the exit slit.

The verification operation is carried out by comparing the output of the photo-tube 105, as measured on the meter 109, with the deflection plate 103 first in a position normal to the monitored line and next at an angle thereto. From the ratio of these photo-electric outputs it is determined if the spectrum is actually in its proper register. The ratio is also determinative of the direction of misalignment should the monitored line be out of register with the exit slit.

After the proper position of the array of exit slits is determined, the spectrum is scanned. A plot of the respective photo-tube output versus spectrum position is recorded for all of the exit slits. For each position along the scan the auxiliary spectrum is monitored for both positions of the deflection plate. The ratio of the photo-tube output for the normal and rotated position is recorded and plotted. This ratio is seen to run from 0 to 00.

From this empirically determined ratio (indicated by the above mentioned scan) the operator can check not only his servoing position but from this information determine the direction to bias the servo system for the proper register. It will be understood that even a slight change in the spacial relationships of the several components will cause the optical centerline of the spectrum to be shifted out of register with respect to the centerline of the apparatus. Any such variations will be detected by the monitoring system which will immediately supply a correcing signal to the servo system and thereby return the centerline of the spectrum into proper register.

The pumping system for evacuating the housing is shown in FIG. 3 and includes a 6" diffusion pump 108 backed by a 15 cubic feet per minute mechanical pump 110. A cold trap 112 is cooled by Freon-carrying coils 114 to minimize backstreaming. In the illustrated embodiment, the housing 10 occupies a 15 cu. ft. volume which may be evacuated to an operating pressure of $10^{-5}$ mm. of Hg in less than one hour. This pressure permits 99.99% transmission and reduces the effect of pressure fluctuations on the apparent chemical concentrations to a negligible level. The tube 26 and its extension 104 being sealed from the interior of the housing 10 by the lens 28 is connected to a conduit 116 for purging by a high transmission gas such as argon or the like.

In the instrument calcium fluoride or fluorite has been employed for windows transmitting wavelengths less than 2000 angstroms. For reflecting surfaces magnesium fluoride overcoated on aluminum has been found to be particularly satisfactory since the magnesium fluoride is non-absorbing to below 1200 angstroms, protects the aluminum from oxidation and increases the deflectance of the aluminum in the extreme ultraviolet range.

As an added feature of this invention, the spectroscope, with a few minor modifications, may be employed to determine the level of evacuation within the housing. This may be achieved by breaking down a source of radiation into two component wavelengths one of which is a function of pressure and one of which is not and comparing their intensities. For example, by using a mercury vapor lamp at the entrance slit, component wavelengths will pass through the exit slits. One of the wavelengths will be below 1850 angstroms and its intensity will be a function of pressure since air absorbs quite strongly at this point. Another of the wavelengths will be in the range of above 2000 angstroms and will be unaffected by pressure.

By comparing the intensities of the two wavelengths, the pressure in the housing may be easily computed. This may be done by comparing the output of two photomultipliers in register with the component wavelengths or by imaging the two wavelengths alternately on the same photomultiplier.

The spectrometer described and illustrated herein is substantially immune to adverse environmental effects by temperature fluctuations. The apparatus is relatively compact, considerably lighter and less expensive than other instruments of similar optical parameters, particularly those adapted to operate in the Schumann region and is more easily evacuated than any other device of similar capabilities. The wavelength coverage is from 1500 to 4300 angstroms with a linear reciprocal dispersion of 2.76 A./mm. This permits observation of the greatest number of sensitive lines with optimum resolution in the Schumann region. In addition, the instrument is sufficiently versatile to accept several ranges of the spectrum with or without a vacuum and this may be accomplished by proper grating choice and/or incident angle values.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. Spectroscopic apparatus, comprising a housing, means for exciting a chemical sample to emit characteristic radiation, a concave diffraction grating mounted to said housing, optical means including a servo controlled entrance slit for directing said radiation onto said grating for dispersing said radiation into a spectrum, said entrance slit being laterally rotatable, an arcuate member disposed along the focal curve of said grating, exit slits mounted along said member and means for reading said spectrum, said arcuate member being fabricated from a material having a coefficient of linear expansion slightly less than the coefficient of expansion of said housing to compensate for effective changes in diffraction angles occasioned by changes in ambient temperatures.

2. Spectroscopic apparatus, comprising a housing, means for exciting a chemical sample to emit characteristic radiation, a concave diffraction grating mounted to said housing, optical means including a servo controlled entrance slit for directing said radiation onto said grating whereby said radiation is dispersed into a spectrum, said entrance slit being laterally rotatable, an arcuate member disposed along the focal curve of said grating, an exit slit supporting strip mounted along the outer curved portion of said member and means for reading said spectrum, said strip being fabricated from a material having a coefficient of linear expansion slightly less than the coefficient of expansion of said housing to compensate for effective changes in diffraction angles occasioned by changes in ambient temperatures.

3. Spectroscopic apparatus according to claim 2 wherein said arcuate member is fabricated from a material having a higher coefficient of expansion than that of said strip whereby said strip will be held tight against said member during changes in ambient temperatures.

4. Spectroscopic apparatus, comprising a housing, means for exciting a chemical sample to emit characteristic radiation, a concave diffraction grating mounted to said housing, optical means including a movable entrance slit for directing said radiation onto said grating whereby said radiation is dispersed into a spectrum, an arcuate member disposed along the focal curve of said grating, a matrix defining a plurality of exit slits mounted along said member, means for reading said spectrum, said member being fabricated from a material having a coefficient of linear expansion slightly less than the coefficient of expansion of said housing to compensate for effective changes in diffraction angles occasioned by changes in ambient temperatures, a monitoring system for detecting misalignment of said spectrum with said exit slits occasioned by mechanical changes in said apparatus and a servo system responsive to signals from said system, said servo system being operatively connected to said entrance slit and adapted to laterally displace said entrance slit upon a signal from said monitoring system to return said spectrum into alignment with said exit slits.

References Cited

UNITED STATES PATENTS

| | | | |
|---|---|---|---|
| 3,080,788 | 4/1963 | Saunderson | 356—80 |
| 3,090,278 | 5/1963 | Saunderson | 356—80 |

RONALD L. WIBERT, Primary Examiner

V. P. McGRAW, Assistant Examiner

U.S. Cl. X.R.

356—85